United States Patent [19]

Moss

[11] 3,715,735

[45] Feb. 6, 1973

[54] SEGMENTIZED MEMORY MODULE AND METHOD OF MAKING SAME

[75] Inventor: William E. Moss, Sunnyvale, Calif.

[73] Assignee: Monolithic Memories, Inc.

[22] Filed: Dec. 14, 1970

[21] Appl. No.: 97,586

[52] U.S. Cl. ..........................340/173 R, 340/173 SP

[51] Int. Cl. ..........................G11c 7/00, G11c 17/00

[58] Field of Search ......................340/173 R, 173 SP

[56] References Cited

UNITED STATES PATENTS

| | | | |
|---|---|---|---|
| 3,434,116 | 3/1969 | Onacker | 340/173 R |
| 3,585,607 | 6/1971 | De Hoan | 340/173 R |
| 3,432,812 | 3/1969 | Elfant | 340/173 R |

*Primary Examiner*—Vincent P. Canney
*Assistant Examiner*—Jay P. Lucas
*Attorney*—Limbach, Limbach & Sutton

[57] ABSTRACT

A method of utilizing a memory array or module containing inoperative memory cells or bits is accomplished by electrically segmentizing the memory module and then permanently isolating the segment(s) containing inoperative bits to form a segmentized but functional memory module. This is accomplished by forcing the address means associated with the segment(s) containing inoperative bits to a permanent, single binary state which is inconsistent with the binary address codes for the memory cells in the segment(s) containing the inoperative bits.

16 Claims, 9 Drawing Figures

INVENTOR.
WILLIAM E. MOSS
BY Limbach, Limbach and Sutton
ATTORNEYS

INVENTOR.
WILLIAM E. MOSS
BY
Limbach, Limbach and Sutton
ATTORNEYS

INVENTOR.
WILLIAM E. MOSS
BY
Limbach, Limbach and Sutton
ATTORNEYS

INVENTOR
WILLIAM E. MOSS
BY Limbach, Limbach and Sutton
ATTORNEYS

SEGMENTIZED MEMORY MODULE AND METHOD OF MAKING SAME

BACKGROUND OF THE INVENTION

The present invention relates to a method of increasing the yield in the manufacture of memory arrays or modules by integrated circuit techniques, and more particularly to a method of segmentizing a memory module to eliminate segments containing random defective bits to provide a workable memory therefrom.

Before now any random defect caused by bad materials or by manufacturing process flaws which caused a small number of bits to be inoperative in a memory module or array caused that memory chip to be rejected at wafer sorting and discarded, thereby decreasing the manufacturing yield. In fact, the manufacturing yield in integrated circuit memory processes is extremely low. As memory modules grow in chip size and in the number of bits, the chance of a random flaw disabling a few bits increases and large amounts of good memory cells have had to be discarded.

SUMMARY OF THE INVENTION

It is therefore an object of the invention to provide a method for utilizing a memory array having random inoperative cells therein.

It is further an object of the invention to provide a method in increasing the manufacturing yield of integrated circuit memory modules, and in particular, to increase the yield percentage significantly.

Another object of the invention is to provide a method of salvaging a memory module containing inoperative bits by electrically segmenting and eliminating portions of the module containing the inoperative bits.

Another object of the invention is to provide a segmentized memory module having inoperative bits which are isolated and do not form a part of the functional memory module.

In accordance with the present invention a method is provided for salvaging memory modules or arrays containing inoperative memory cells or bits. This is accomplished by electrically segmentizing the memory module and then permanently isolating, and therefore, effectively eliminating from the operation of the memory module, the segment or segments containing the inoperative cells.

To eliminate the segment(s) containing the inoperative cells, the address means associated with the segment(s) containing the inoperative cells is forced to a permanent binary state which is inconsistant with the address codes associated with the cells in the segment(s) containing the inoperative bits.

BRIEF DESCRIPTION OF THE DRAWINGS

FIG. 83 graphically illustrates the operation of the bit-line driver/sense amplifier of FIG. 8B.

DESCRIPTION OF THE PREFERRED EMBODIMENTS

Figure 1:
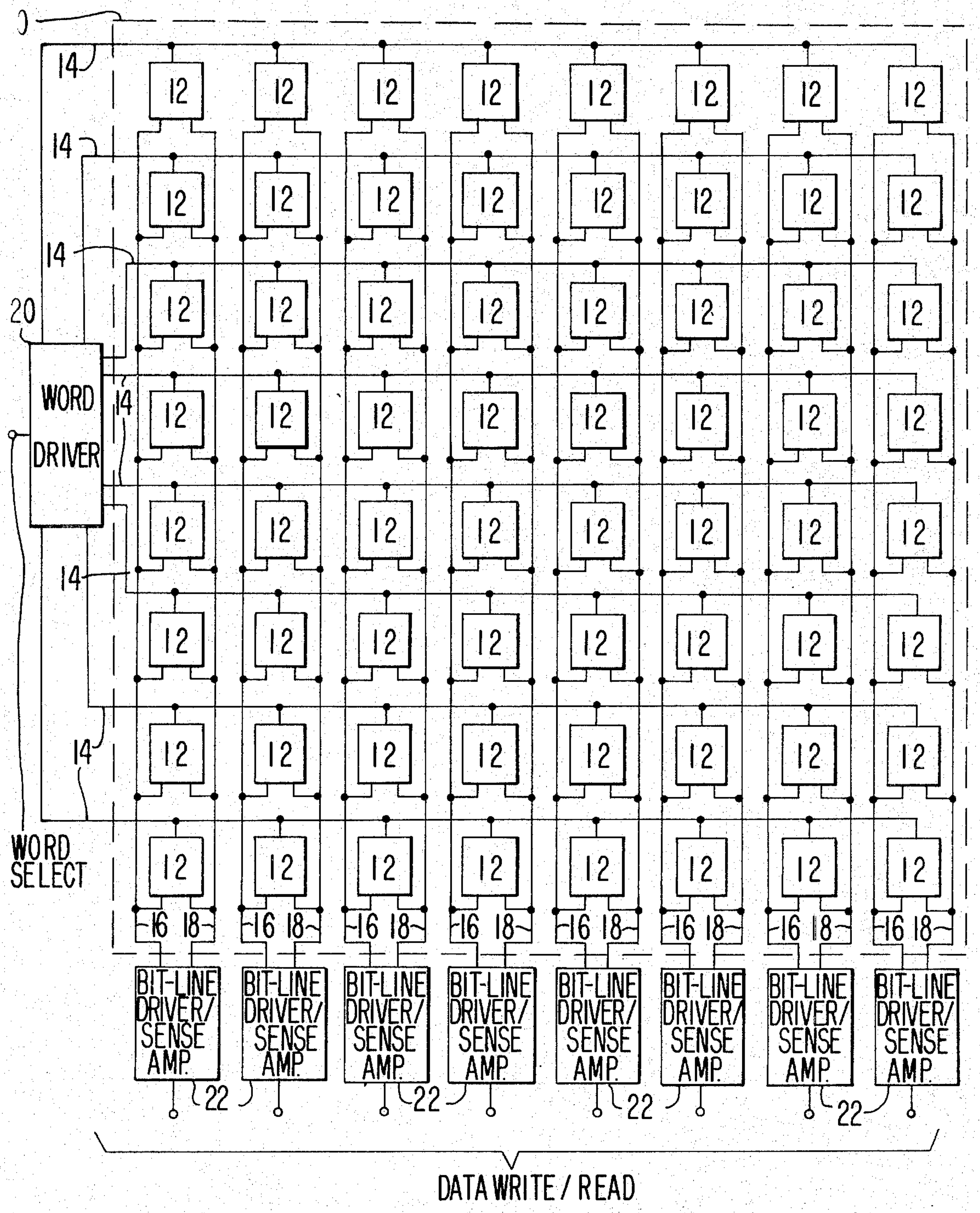
FIG. 1 illustrates schematically a matrix of memory cells forming a memory module or array and associated address circuitry.

FIG. 1 illustrates schematically a memory module or array 10 composed of a matrix of memory cells 12 each of which is capable of storing a binary ZERO or a binary ONE. Connected to each row of cells 12 is a word line 14 and with each row of cells 12 a pair of bit lines 16 and 18. In some memory modules a second word line is provided for each row of cells 12 and it should be understood that the present invention is applicable to such an arrangement.

Associated with each of the word lines 14 is a word driver circuit 20 and with each pair of bit lines 16 and 18, a bit-line driver/sense amplifier 22. When it is desired to read or write information from a particular memory cell the word line and bit lines for that cell are enabled, in a manner well known to those skilled in the art. Each memory cell 10 is operated in three different modes: (1) inactive, where the cell is storing information in a low power state; (2) write, when the information is to be electrically altered; and (3) read, where the memory cell contents are sensed by the bit-line driver/sense amplifiers 22.

The illustrated memory module 10 consists of an 8 × 8 matrix of cells, i.e., a 64-bit memory. This particular size module is only illustrative, and the present invention is applicable to memory modules both larger and smaller than the one illustrated.

The memory module can, for example, be made by large scale integration (LSI) techniques. However, the invention is applicable to other types and constructions of memory modules.

Figure 2:
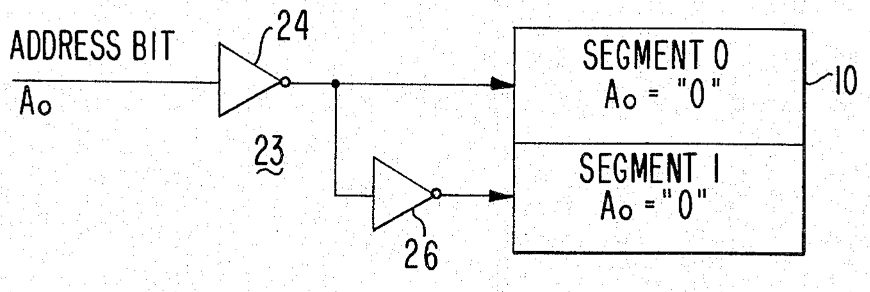
FIG. 2 is a generalized block diagram of a memory module segmentized in accordance with the invention into two segments to eliminate inoperative cells within one of the segments.
Figure 3:
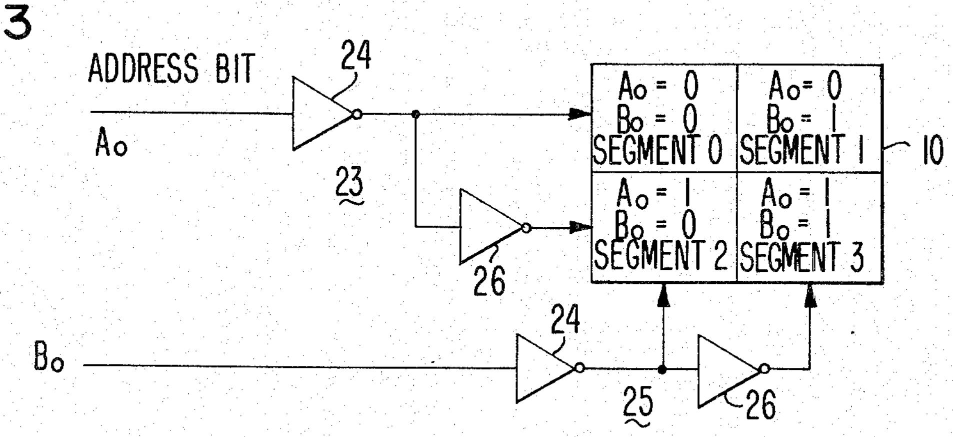
FIG. 3 is a generalized block diagram of a memory module segmentized in accordance with the present invention into four segments to eliminate inoperative cells within one or more of the segments.

The general principles of the present invention can best be seen by reference to FIGS. 2 and 3, each of which shows in block form a memory module 10 like the module 10 of FIG. 1.

In FIG. 2 the memory module is divided into two segments or portions, segment 0 and segment 1. Supposing that it has been found that there are inoperative cells located in segment 1. Then in accordance with the invention, the cells of segment 1 are isolated and rendered inoperative, and only the cells of segment 2 are utilized. While this has the effect of reducing the storage capacity of memory module 10 in half, i.e., from a 64-bit to a 32-bit memory in case of the 8 × 8 matrix of FIG. 1, the memory 10 can still be utilized and therefore the entire memory module does not have to be discarded.

In a similar manner if inoperative cells are located solely within segment 0, the segment 0 is rendered inoperative and only the cells of segment 1 are utilized. Of course if there are inoperative cells in both segments in the embodiment of FIG. 2, the module cannot be salvaged and must be discarded.

Address inputs are used to select the particular segment to isolate. Each memory cell within the matrix memory module 10 is enabled by a particular combination or code of binary numbers issuing from the word and bit-line addresses. Thus in FIG. 2, for example, to address or enable any of the cells of segment 0, the address bit, Ao, must be a binary ZERO. Similarly, to enable the cells of segment 1, the address bit, Ao must be a binary ONE.

To isolate and eliminate, for example, segment 0 containing inoperative cells, the cells of segment 0 are permanently addressed or forced to a binary ZERO state, which, as explained above, is incompatible with the operation of the cells within segment 0. The remaining half of the memory 10 is then a good functional unit of one half of original size.

The segment containing the inoperative cells is permanently addressed to a single binary state by forcing either the word lines or the bit lines or a combination of the two associated with that segment to the single state.

Note that when the address bit Ao is ZERO, the actual input to segment 0 is a high level, or binary ONE signal. This occurs because of the operation of Ao buffer 23 including buffer/inverter 24 which forms a part of the word driver 20 of FIG. 1, and which will be described in more detail subsequently. Because of a second buffer/inverter 26 forming a part of Ao buffer 23 the binary value of Ao corresponds to the actual binary signal applied to the cells of segment 1.

To increase the flexibility of the segmentizing method of the present invention additional address bits can be provided. Thus, in FIG. 3 two address bits, an Ao buffer 23 and an additional buffer, Bo buffer 25 are used to divide the module into four segments. If three address bits are used the module is segmentized into 8 parts. The number of segments or sub-arrays *M* is given by the relationship:

$$M \times 2^N$$

where N is the number of address bits.

The advantage of increased segmentization is that a greater yield can be realized. For example, suppose that there are inoperative cells in segments 1 and 2 in the module of FIG. 3. As will be seen, by properly force-addressing the module, these two segments can be isolated and made inoperative and the module salvaged. Where there is only a single address as in FIG. 2, there is no way of salvaging the module 10 since there are inoperative cells in each of the two segments. The greater the number of address bits the more freedom is available for selecting the operative half of the memory module.

Figure 4:
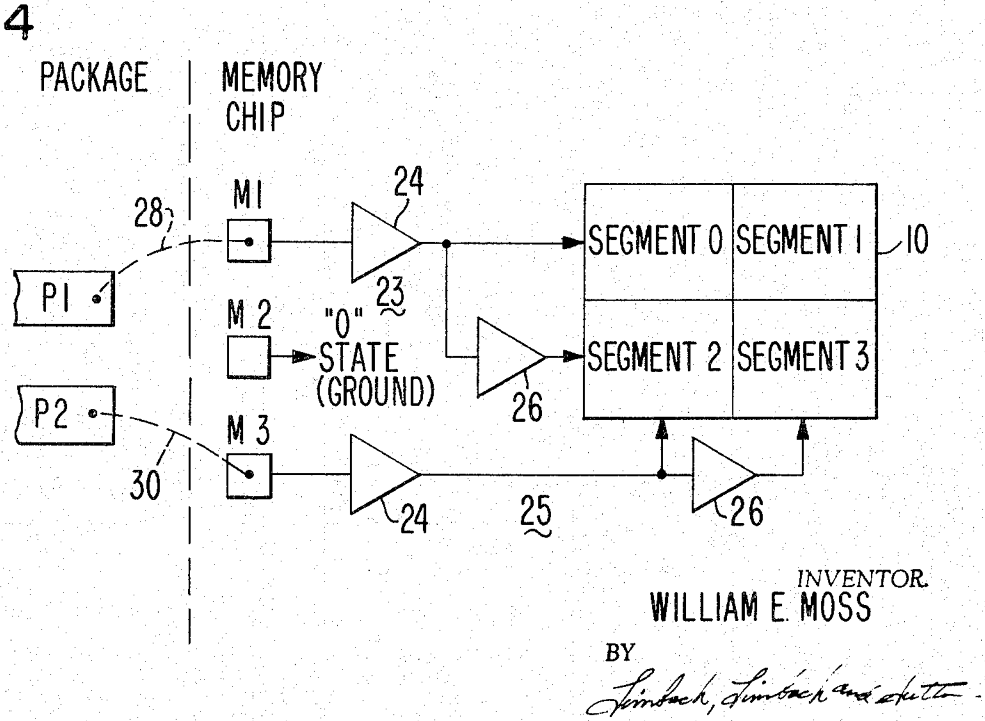
FIG. 4 illustrates the wiring connections for the actual physical embodiment of FIG. 3.

One method of force-addressing the segments of a memory module is illustrated in FIG. 4, showing a four-segment memory array 10, as in FIG. 3, forming a part of a memory chip. The remaining module circuitry, except for buffer/inverters 24 and 26, is not shown. Three contacts M1, M2 and M3 are also contained on the memory chip.

Leads or contacts P1 and P2, located on the package which holds the integrated memory module circuit 10 supply the address bits Ao and Bo to the module 10 by lead wires 28 and 30 connected between the appropriate contacts on the package and those on the memory chip.

With the lead wires 28 and 30 connected in the manner illustrated in FIG. 4, all segments are operational. This is the way in which a memory module 10 containing no inoperative bits is connected.

To isolate and eliminate inoperative bits in either segment 0, segment 1, or both segments 0 and 1, line 28 is connected from contact P1 to contact M3, and line 30 is eliminated. This means that the input to Ao buffer 23 is always an open circuit, i.e., a high or a binary ONE situation. Since both segments 0 and 1 require that Ao = ZERO to be enabled, these segments are effectively permanently eliminated from the operation of the module 10, and only segments 2 and 3 are used.

To isolate and eliminate segment 2, line 30 is not used, wire 28 is bonded between terminals P1 and M3, and a connection is made between M1 and M2. M2 is connected to ground which corresponds to the binary ZERO state, thereby keeping Ao in a permanent ZERO state.

In a similar manner to avoid segment 3, P1 is bonded to M3, and M1 to M3. To avoid segments 1 and 2, P1 is bonded to M1 and P1 is also bonded to M3, thereby insuring that Ao is always the same as Bo.

The above described method has the additional advantage that all memories assembled with one-half the original number of bits have the same contact or pin configuration when packaged, regardless of which half of the memory is used.

Figure 5:
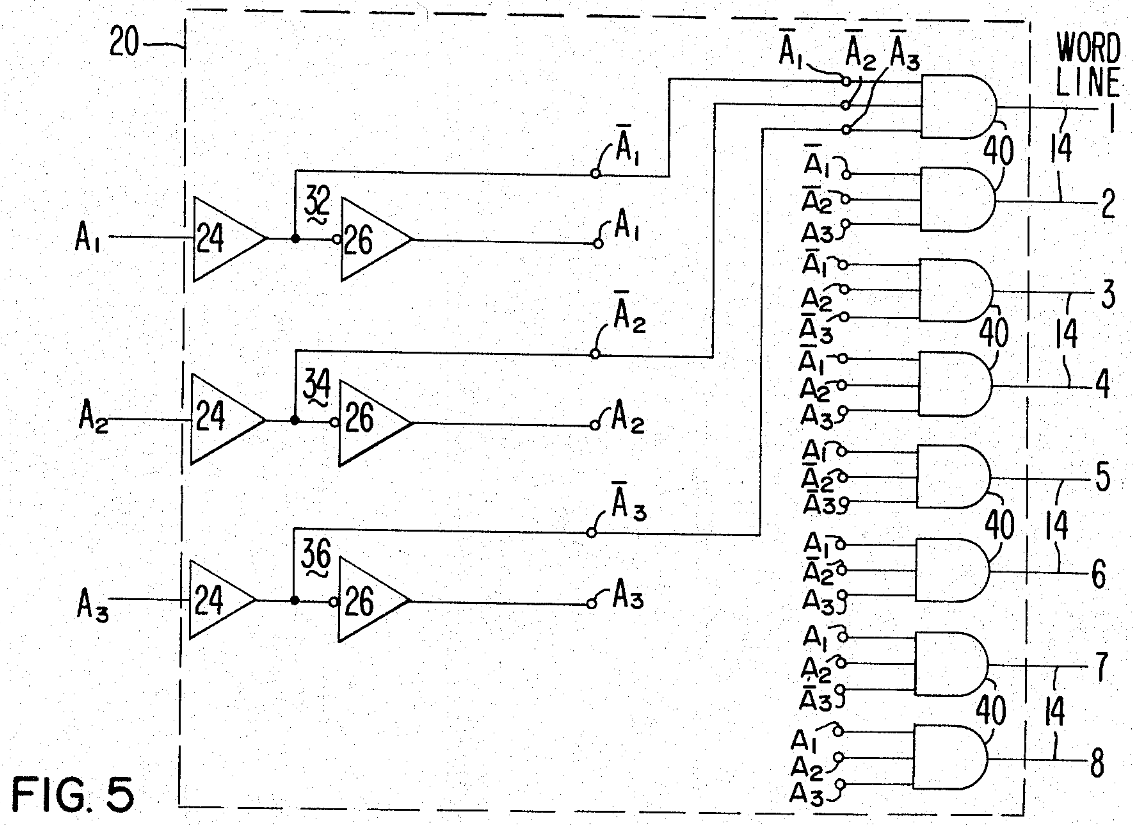
FIG. 5 is a more detailed schematic diagram of the word driver shown generally in FIG. 1.

A detailed schematic of word driver 20 (FIG. 1) is shown in FIG. 5. Here N, the number of address bits is three, i.e., A1, A2 and A3 and hence the memory module 10 of FIG. 4 is capable of being divided into $2^3$ or 8 segments.

Word driver 20 includes an A1 buffer circuit 32, an A2 buffer circuit 34, and an A3 buffer circuit 36. The A and the $\bar{A}$ outputs from each of the buffers connected to decoders 40 which in turn are connected to the respective word lines 14. Each of the decoders 40 provides an output for a unique combination of binary input signals. For purposes of illustration the actual connections between the buffers and the decoder 40 for word line 1 have been shown. It is to be understood that all of the decoders 40 in actual practice are connected to the indicated buffer outputs.

Figure 6:
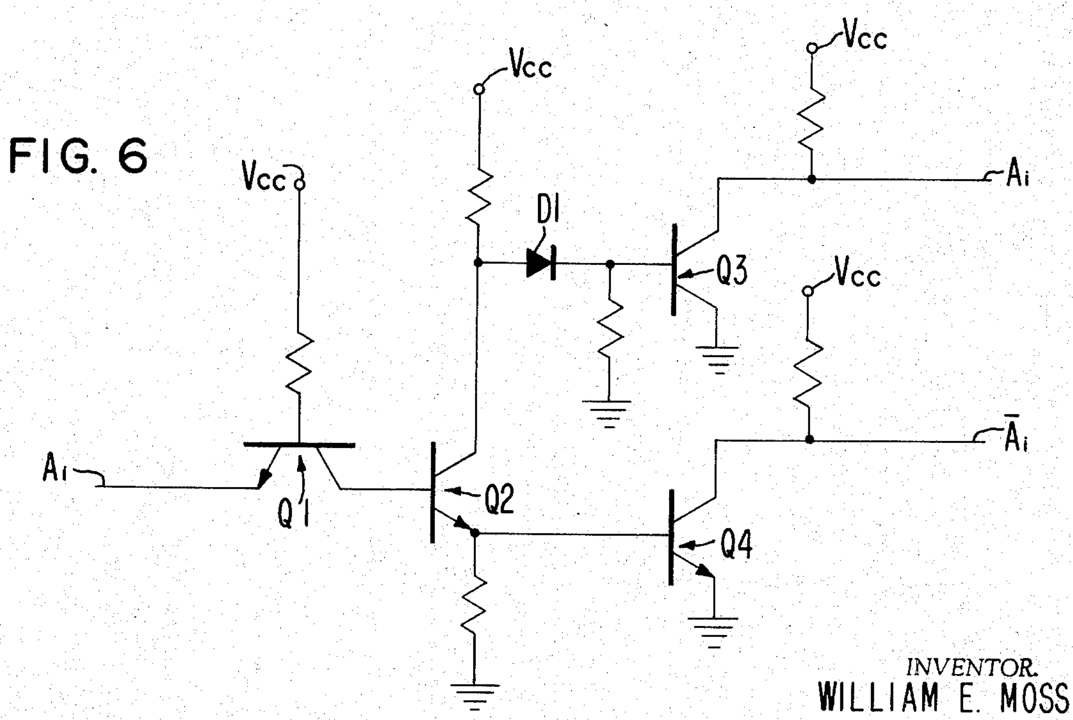
FIG. 6 is a detailed schematic diagram of a buffer utilized in the present invention.

FIG. 6 illustrates schematically one circuit suitable for use as a buffer in the aforesaid embodiment of the invention.

Figures 7, 8A, 8B:
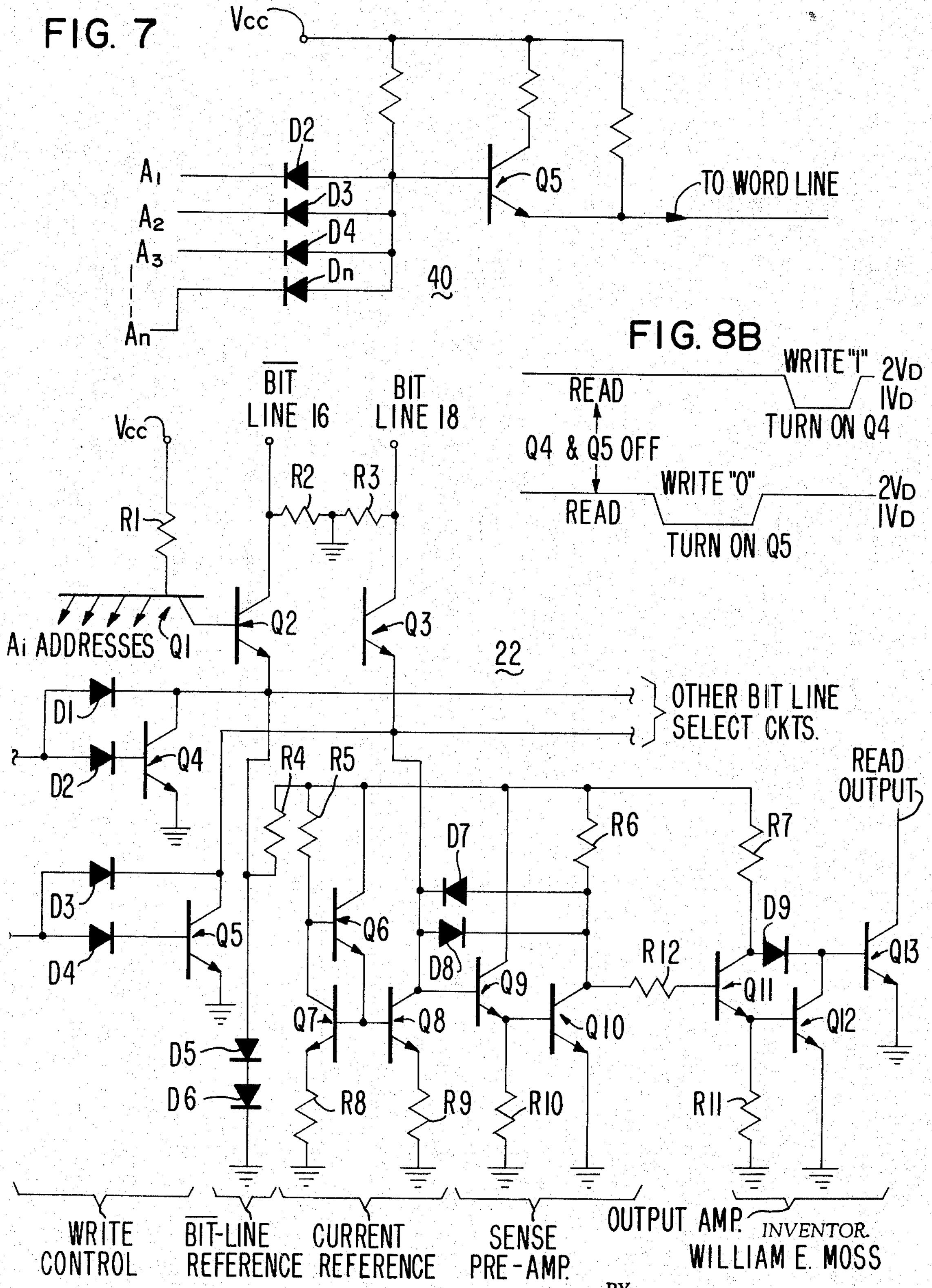
FIG. 7 is a detailed schematic diagram of a decoder shown generally in FIG. 5.
FIG. 8A is a detailed schematic of the bit-line driver/sense amplifier shown generally in FIG. 1.

FIG. 7 illustrates one operative embodiment of the decoder 40 shown generally in FIG. 5.

FIG. 8A illustrates an operative example of one of the bit line driver/sense amplifiers 22 shown in FIG. 1. FIG. 8B graphically illustrates the operation of the bit-line driver/sense amplifier of FIG. 8A, where $V_D$ is equal to a diode junction voltage drop.

Multi-emitter $Q_1$ forms the bit-line decoder for the circuit 22. Thus, if it is desired to isolate and eliminate the cells connected to the bit lines 16 and 18 shown in FIG. 8A, one of the inputs to $Q_1$ is pulled permanently to a low voltage, i.e., a binary ZERO state causing transistors $Q_2$ and $Q_3$ to be off permanently.

I claim:

1. A memory array containing a matrix of memory circuits, and wherein said array includes inoperative circuits, comprising;

a. means for electrically segmentizing said memory array into M sub-arrays by providing N address bits to said memory array, where $M=2^N$;

b. means for identifying sub-arrays containing inoperative bits; and c. means for permanently isolating $2^{N-1}$ sub-arrays including those sub-arrays containing inoperative bits by permanently maintaining the address bits associated with said sub-arrays at a single binary signal level inconsistent with the operation of said sub-arrays.

2. An operational memory module comprising a matrix of memory cells and at least one word line linking each row of memory cells, a pair of bit lines linking each column of memory cells, means associated with said word lines and said bit lines for selectively enabling any desired memory cell in said module, each of said cells being addressed by a unique combination of binary coded signals, and wherein the improvement comprises:

means for segmentizing said memory module into $M$ equal sub-modules by providing N address signals thereto, where $M = 2^N$;

means for permanently driving $2^{N-1}$ of said sub-modules into a single continuous binary state incompatible with the binary address codes associated with the memory cells associated with said sub-modules, said $2^{N-1}$ sub-modules containing sub-modules having inoperative bits; and means for utilizing the remaining sub-modules as an operative memory module.

3. The memory module of claim 2 wherein said address means includes decoder means associated with each of said word lines and each of said pair of bit lines and wherein said driving means includes means for driving selected word line and bit line decoders.

4. The memory module of claim 2 wherein N is 1 and $M$ is therefore 2.

5. The memory module of claim 2 wherein N is 2 and $M$ is therefore 4.

6. The memory module of claim 2 wherein N is 3 and $M$ is therefore 8.

7. In a memory module having a matrix of memory cells having at least one word line linking each row of memory cells and a pair of bit lines linking each column of memory cells, and wherein said memory module additionally includes address means associated with said word lines and said bit lines for selectively enabling any desired memory cell in said module, each of said cells being addressed by a unique combination of binary coded signals, wherein the invention comprises the method of segmentizing said memory module into $M$ equal sub-modules by providing N address signals thereto, where $M=2^N$; permanently driving $2^{N-1}$ of said sub-modules into a single continuous binary state incompatible with the binary address codes associated with the memory cells associated with said sub-modules, said $2^{N-1}$ sub-modules containing sub-modules having inoperative bits; and utilizing the remaining sub-modules containing operative bits.

8. The method of claim 7 wherein said address means includes decoder means associated with each of said word lines and each of said pair of bit lines and wherein said step of driving said portion of said address means comprises driving selected word line and bit line decoders.

9. The method of claim 7 wherein N is 1 and $M$ is therefore 2.

10. The method of claim 7 wherein N is 2 and $M$ is therefore 4.

11. The method of claim 7 wherein N is 3 and $M$ is therefore 8.

12. A method of electrically segmentizing a memory module to eliminate segments containing inoperative bits comprising permanently addressing $2^{N-1}$ of $2^N$ equal segments of bits of the memory module including those segments containing inoperative bits therein with a continuous signal of a single binary state, said latter binary state being incompatible with the address codes associated with the bits of said $2^{N-1}$ segments.

13. A method of utilizing a memory array containing a matrix of memory circuits and wherein said array includes inoperative circuits, comprising the steps of:

a. segmentizing said memory array into $M$ sub-arrays by providing N address bits to said memory array, where $M = 2^N$;

b. locating sub-arrays containing inoperative memory circuits;

c. electrically isolating $2^{N-1}$ sub-arrays including those sub-arrays containing inoperative bits by permanently maintaining the address bits associated with said sub-arrays at a single binary signal level inconsistent with the operation of said sub-arrays.

14. The method of claim 13 wherein N is one and $M$ is two.

15. The method of claim 13 wherein N is two and $M$ is four.

16. The method of claim 13 wherein N is three and $M$ is eight.

* * * * *